United States Patent Office 3,234,174
Patented Feb. 8, 1966

3,234,174
LOW TEMPERATURE, SOLVENT RESISTANT DIMETHYL ORGANOSILOXANE ELASTOMERS CONTAINING PENDANT ETHYL GROUPS AND UNSATURATED HYDROCARBON GROUPS
Thomas C. Williams, Lancaster, N.Y., assignor to Union Carbide Corporation, a corporation of New York
No Drawing. Filed Mar. 27, 1961, Ser. No. 98,296
14 Claims. (Cl. 260—37)

This invention relates to improved vulcanizable siloxane compositions and to the elastomers made therefrom. More particularly, this invention relates to siloxane compositions vulcanizable to solvent-resistant elastomers having excellent low temperature properties and good thermal stability.

It is known, heretofore, that siloxane elastomers having good low temperature properties can be prepared from polysiloxanes having pendant methyl and phenyl groups. These polysiloxanes are expensive to produce and in addition the elastomers prepared therefrom are not very resistant to the attack of aromatic solvents.

It is also known that siloxane elastomers having good low temperature properties can be prepared from polysiloxanes having pendant methyl and ethyl groups. The siloxane elastomers thus prepared suffer from the disadvantage that when subjected to elevated temperatures they lose their elastomeric properties within a relatively short time.

It is an object of this invention to produce siloxane elastomers having excellent low temperature properties, good thermal stability and which are more resistant to solvent degradation than are those low temperature silicon elastomers having pendant methyl and phenyl groups.

It is a further object of this invention to produce siloxane elastomers having excellent low temperature properties and good thermal stability, from copolymeric polysiloxane gums containing dimethylsiloxane units, diethyl or ethylmethylsiloxane units and particular amounts of olefinically unsaturated hydrocarbon siloxane units.

The present invention is based upon my discovery that siloxane elastomers having excellent low temperature properties and improved thermal stability can be produced from compositions comprising (1) Copolymeric dihydrocarbonpolysiloxane gums
(2) A silica filler
(3) A heat stabilizing additive, and
(4) An organic peroxide organopolysiloxane gum curing agent.

The copolymeric dihydrocarbonpolysiloxane gums which are employed in producing the compositions and elastomers of this invention are essentially linear dihydrocarbonpolysiloxanes and contain in their molecular structure particular amounts of certain saturated hydrocarbon groups, namely, methyl groups and ethyl groups and particular amounts of olefinically unsaturated hydrocarbon groups, such as, vinyl, allyl, butenyl and cyclohexenyl groups. To produce the improved vulcanizable compositions and elastomers of this invention I have found that the amounts of methyl, ethyl and the olefinically unsaturated groups must be maintained within the defined limits in order to obtain elastomers characterized by resistance to aromatic solvent, flexibility at low temperature and thermal stability. Thus, I have found that, of the total number of moles of the saturated hydrocarbon groups and olefinically unsaturated hydrocarbon groups present in the copolymeric dihydrocarbonsiloxane, 4.0 to 6.03 mole percent should be ethyl groups, from 0.0185 to 0.5 mole percent should be olefinically unsaturated groups and from 93.47 to 95.9815 mole percent methyl groups.

More particularly, the copolymeric dihydrocarbonpolysiloxane gums which are employed in producing the compositions and elastomers of this invention are essentially linear dihydrocarbonpolysiloxane gums having a degree of polymerization of about 2000 or higher. These essentially linear dihydrocarbonpolysiloxane gums have viscosities ranging from pourable liquids to materials which will barely flow when unconfined. Such gums can have molecular weights in the range of from 100,000 to 3,000,000 or even higher. These gums are readily depicted as containing units of the formulas:

(1) 

(2) 

or (3) 

and (4) 

wherein R is a methyl or ethyl group and $R^1$ is an olefinically unsaturated monovalent hydrocarbon group such as vinyl, allyl, butenyl, cyclohexenyl and the like and wherein the amount of the methyl groups, ethyl groups and olefinically unsaturated monovalent hydrocarbon groups are maintained within the above-defined limits. The starting polysiloxane gums preferably contain hydrocarbon pendant groups and silicon atoms in the ratio of 2.0 hydrocarbon groups per silicon atom (approximately). Deviation from a ratio of 2 in any instance, as for example, ratios of from about 1.95 to about 2.05, with respect to the preferred practices will be insignificant for all practical purposes since it will be attributable to the presence of end-blocking hydrocarbon groups whose total numbers will be insignificant as compared with the total numbers of hydrocarbon groups attached to silicon atoms of linear polysiloxane chains or to the presence of siloxane units having only one hydrocarbon group bonded to silicon.

The organopolysiloxane gums employed in the compositions of the invention can also contain small amounts (less than 0.9 percent by weight) of organic end-blocking or chain terminating groups. By way of illustration, the gums can contain small amounts of alkoxy end-blocking groups, such as methoxy, ethoxy, propoxy, butoxy and the like.

In producing the vulcanizable compositions and elastomers of this invention any of the finely divided reinforcing silica fillers, commonly used in the production of siloxane elastomers, can be employed. Such silica fillers are, for example, finely divided fume silicas, precipitated silicas and diatomaceous silicas. The amount of silica filler employed can be from 10 to 80 parts by weight silica per 100 parts by weight of the copolymeric dihydrocarbonpolysiloxane gum. It is preferred that the silica filler be employed in amounts of from 20 to 40 parts by weight per 100 parts by weight of the gum.

Other materials, for example, coloring agents, extenders and plasticizers can also be employed in the compositions and elastomers of this invention. Such coloring agents are, for example, zinc oxide, titanium dioxide, chrome oxide, carbon black and the like. Such extenders are, for example, calcium carbonate, zirconium silicate and the like. The plasticizers are, for example, the alkoxy and/or hydroxy end-blocked dihydrocarbonpolysiloxane oils.

It has been found that unless a heat stabilizer is employed in the compositions of this invention, the elastomers prepared therefrom are deficient in heat-aging properties, that is, the physical properties of the elastomer rapidly deteriorate on being exposed to high temperatures, for example exposure to temperatures of from 150° C. to 300° C. for from 12 to 24 hours. The heat stabilizer which can be employed in the compositions and elastomers of this invention include ferric oxide ($Fe_2O_3$) ferric octoate, ferric 2-ethylhexoate, finely divided cupric acetate, cupric acetate monohydrate, and mixtures of ferric octoate or 2-ethylhexoate and cupric acetate or cupric acetate monohydrate.

When ferric oxide ($Fe_2O_3$) is employed as the heat stabilizer, amounts of from 1 to 2 parts by weight ferric oxide per 100 parts by weight of the gum are employed. The amounts of cupric acetate, cupric acetate monohydrate, and/or ferric octoate or ferric 2-ethylhexoate employed in the compositions and elastomers are such so as to give from 15 to 1000 parts iron ($Fe^{+++}$) or copper ($Cu^{++}$) by weight (calculated as the metal) per million parts by weight of the gum, preferably the iron and/or copper is present in amounts of from 200 to 800 parts by weight per million parts by weight gum.

It has been found that when the heat stabilizer is cupric acetate, it should be incorporated in the gum in a finely divided state, as otherwise no improvement in the heat-aging properties of the elastomer is obtained.

By finely divided state is meant an average particle size of less than 200 mesh, that is, a particle size sufficiently small so that 100 percent of the particles will pass through a 200 mesh screen. Preferably the particle size is one micron or less. The cupric acetate heat stabilizer can be produced in finely divided form by forming a coating of cupric acetate monohydrate on a finely divided inert solid such as, finely divided quartz, kaolin, calcium carbonate, diatomaceous earth and the like; according to the following procedure, cupric acetate monohydrate is dissolved in ethanol to form a homogeneous solution. The cupric acetate monohydrate-ethanol solution is then sprayed onto finely divided silica or other finely divided inert solid while the silica is agitated, for example, by continuous tumbling in a twin cone blender. The cupric acetate monohydrate-ethanol-silica blend is then heated to a temperature of from about 78° C. to about 150° C. to evaporate the ethanol and produce a cupric acetate monohydrate coated finely divided silica. The amount of cupric acetate monohydrate which is coated onto the finely divided silica can be from 0.005 to 12 parts by weight cupric acetate monohydrate per 100 parts by weight of the finely divided silica.

In producing the improved siloxane elastomers of this invention, I can employ as organopolysiloxane gum curing agents organic peroxides, such as, the dialkylperoxides, the diacylperoxides, and the mixed alkyl acylperoxides.

Especially suitable curing agents are the dialkyl peroxides which can be graphically depicted by the formula

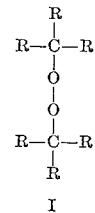 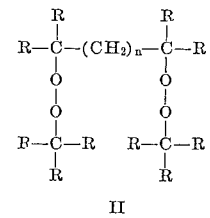

I                        II wherein R represents the same alkyl group throughout or alkyl groups of two or more different types and $n$ in Formula II is zero (0) or a larger integer.

Among the specific curing agents that I prefer to employ are included:

Di-tertiary-butyl peroxide;
Tertiary-butyl-triethylmethyl peroxide;
2,5-bis(tertiary-butylperoxy)2,5-dimethylhexane;
Tertiary-butyl-tertiary-triptyl peroxide, the composition of which is represented by the structural formula:

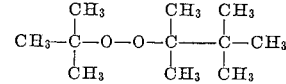

and phenyl substituted ditertiary alkyl peroxides such as dicumyl peroxide.

I can also employ, as curing agents, other organic peroxides. Such organic peroxides, when employed in appropriate amounts, will effect the same degree of curing as our improved silicone compounds through the same agencies or through agencies in addition to the unsaturated groups, as for example, through methyl to methyl groups. In such instances not all of the unsaturated groups present necessarily enter into cross-linking reactions. Typical of such peroxides are the acyl peroxides which include benzoyl peroxide, and the like, mixed alkyl-acyl peroxides which include tertiary butyl perbenzoate, and the like, chloroacyl peroxides such as 1,4-dichlorobenzoyl peroxide, 2,4-dichlorobenzoyl peroxide, monochlorobenzoyl peroxide and the like.

The amount of the curing catalyst employed in producing the siloxane elastomers of this invention can be by weight from 0.1 part catalyst per 100 parts of the siloxane gums to 2.5 parts catalyst per 100 parts gum. It is preferred to employ from 0.5 to 1.5 parts catalyst per 100 parts of the siloxane gum in order to obtain fully cured elastomers.

The organopolysiloxane gum compositions of this invention are produced by admixing at room temperature the dihydrocarbonpolysiloxane gum, filler and catalyst until a uniform dispersion is obtained.

The admixtures of the dihydrocarbonpolysiloxane gum, filler and curing catalyst are commonly referred to as "siloxane gum compounds."

Suitable apparatus for preparing the curable siloxane gum compounds of this invention include milling rolls operating at differential speeds, Banbury mixers and the like. According to the milling technique, the dihydrocarbonpolysiloxane gum is charged onto the roll mill and milled to give a uniform sheet. The filler is then added in suitable amounts and the milling continued until the filler is uniformly dispersed throughout the organopolysiloxane gum. The heat stabilizer is then added and milling continued to give a uniform dispersion. The curing catalyst is then added and the milling continued until uniform dispersion is obtained.

The compositions of this invention can be molded or extruded and cured to elastomers by heating the compositions to a temperature sufficiently elevated so as to cause the decomposition of the organic peroxide organopolysiloxane gum curing catalyst, thereby curing the composition to an elastomer. The temperature to which the composition is heated will, of course, depend upon the decomposition temperature of the particular organic peroxide dihydrocarbonpolysiloxane gum curing catalyst employed, thus the temperatures can be from about 100° C. to about 300° C. or higher. For example, when a diacyl peroxide as dibenzoyl peroxide is employed as the curing catalyst the compositions are cured to elastomers by heating to a temperature of about 250° F. for 15 to 20 minutes, whereas, when a dialkyl peroxide such as, ditertiary butyl peroxide is employed (where the dihydrocarbonpolysiloxane gum contains silicon-bonded olefinically unsaturated groups), the compositions are cured to elastomers by heating to a temperature of about 340° F. for 20 to 25 minutes.

It is sometimes desirable to age a mixture of the organopolysiloxane gum and filler prior to adding the curing catalyst thereto. Aging for a period of from about one day to one week at room temperature, or heat-aging at an elevated temperature (above about 250° F.) for a period of from about one to two hours or more, provide opportunity for better wetting of the filler by the polysiloxane gum. In addition, precure heat-aging effectively eliminates objectionable volatile matter such as water and absorbed gases (carried into the mixture by the filler) at a stage wherein distortion resulting from gas elimination is not harmful, and thus reduces the amount of gas that must be eliminated by postcure heat-aging at a time when density and structural form must be retained.

At the conclusion of such aging treatment, the curing catalyst can be incorporated into the mixture and the resulting mixture heat-cured to an elastomer. If desired, the elastomer may then be subjected to postcure heat-aging. Such postcure treatments serve to stabilize the physical properties of the elastomer and to improve the electrical properties of the elastomer. Postcuring can be conducted by heating at a temperature of about 350° F., preferably at a temperature of about 480° F., for a period of about twenty-four hours.

Preparation of the starting dihydrocarbon-substituted polysiloxanes (siloxane gums) which contain ethyl, methyl and olefinically unsaturated hydrocarbon groups can be carried out by means of any of the procedures whose fundamental principles are known to those skilled in the art. By way of illustration, such polysiloxanes can be produced by following a procedure involving mixing suitable siloxanes in proportions such as to provide in the resulting linear polysiloxane a predetermined number of methyl and ethyl groups and of olefinically unsaturated hydrocarbon groups with respect to the total number of hydrocarbon groups present therein, and subject the mixtures to an appropriate equilibration treatment under controlled conditions to produce linear polysiloxanes of desired molecular weights and viscosities and having methyl, ethyl and olefinically-unsaturated pendant groups attached to the silicon atoms thereof in appropriate amounts as hereinbefore set forth.

Thus, for example, in the production of a linear polysiloxane gum useful as the starting material for the compositions of the invention, a polymer having methyl, ethyl, and vinyl groups bonded to the silicon atoms thereof can be produced by forming an admixture of (1) one or more dimethylcyclosiloxanes such as hexamethylcyclotrisiloxane, octamethylcyclotetrasiloxane, decamethylcyclopentasiloxane and the like; (2) hexaethylcyclotrisiloxane or one or more cyclic methylethylpolysiloxanes, such as, trimethyltriethylcyclotrisiloxane $$[CH_3(C_2H_5)SiO]_3$$

tetramethyltetraethylcyclotetrasiloxane

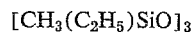

and the like; (3) one or more cyclic ethyl or methylvinylpolysiloxanes, such, for example, as the trimer

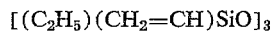

or the tetramer $[(C_2H_5)(CH_2=CH)SiO]_4$,

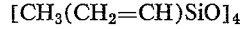

or both, (4) potassium silanolate,

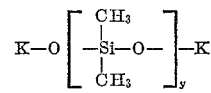

where $y$ is an integer of at least 1, in an amount sufficient to provide thirty (30) parts by weight of potassium ion ($K^+$) per million parts by weight of the siloxanes, (5) cesium hydroxide, in an amount sufficient to furnish from 10 to 500 parts cesium per million parts of the polysiloxane and preferably from 50 to 300 parts cesium per million parts polysiloxanes, and (6) an amount of one or more monofunctional compounds such as hexamethyldisiloxane calculated to function as end-blockers for limiting the degree of polymerization and, consequently, the lengths and molecular weights of the linear polysiloxane chains and for stabilizing the polymers. After vigorous stirring in order to effect thorough dispersion of the components and the production of a substantially homogeneous product, the mixture is heated in a sealed vessel at a temperature of about 150° C. for a period of time varying from about one hour to two and one-half hours, to produce a gum.

The gum compositions of this invention can also contain as a plasticizer a hydroxy or alkoxy end-blocked dihydrocarbonpolysiloxane oil. While the hydroxy or alkoxy end-blocked dihydrocarbonpolysiloxane oil is not essential to the compositions of this invention, the use of the hydroxy or alkoxy end-blocked oil gives improved milling characteristics to the gum compositions.

The amount of such plasticizer employed can be from 1 to 100 parts by weight of the plasticizer per 100 parts by weight of the gum, preferably such plasticizer is employed in amounts of from about 4 to about 80 parts by weight per 100 parts by weight of the gum. The hydroxy and alkoxy end-blocked dihydrocarbonpolysiloxane oils suitable for use in the present invention are those relatively low molecular weight polysiloxane oils whose polymer chains have at least two and as much as thirty-five and more dihydrocarbonsiloxy units ($R_2SiO$) per molecule and which contains an average of at least one hydroxyl group per terminal silicon atom of the molecule. Such polysiloxanes may be represented by the general formula:

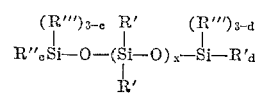

wherein $R'$ and $R''$ are monovalent hydrocarbon radicals, for example, alkyl groups such as methyl, ethyl, propyl and the like; aryl groups such as phenyl, naphthyl and the like, aralkyl groups such as benzyl, phenylethyl and the like, alkaryl groups, such as tolyl, xylyl, ethylphenyl and the like; cycloalkyl groups, such as cyclopentyl, cyclohexyl and the like; alkenyl groups such as vinyl, allyl, butenyl, cyclohexenyl and the like; $R'''$ is a hydroxyl or an alkoxy group such as methoxy, ethoxy, propoxy, and the like; and (c) has a value from 0 to 2; (d) has a value of from 0 to 3; the sum of (c) and (d) is not in excess of 4, (x) has a value of from 2 to 35 inclusive; and $R'$ as well as $R''$ can be different group members in a molecule.

Most preferred for use in the compositions of this invention are those hydroxy or alkoxy end-blocked polysiloxane oils having from four to twenty dihydrocarbonsiloxy units per molecule.

It is preferred to employ as the polysiloxane oil, a hydroxy or alkoxy end-blocked dihydrocarbon substituted polysiloxane oil whose hydrocarbon substituents consist of one or more types of hydrocarbon groups taken from the class consisting of methyl, ethyl, phenyl, vinyl, allyl, cyclohexenyl groups. Illustrative of polysiloxane oils suitable for use in my invention are those hydroxy and alkoxy end-blocked dihydrocarbon-substituted polysiloxanes whose polymeric chains comprise one or more types of substituted siloxy units such as dimethylsiloxy, diethylsiloxy, diphenylsiloxy, methylvinylsiloxy, ethylvinylsiloxy, methylphenylsiloxy and the like dihydrocarbonsiloxy units. Such hydroxy end-blocked polysiloxane oils can be prepared in a manner similar to that described below. By way of illustration a hydroxy end-blocked polysiloxane oil containing dimethylsiloxane units and ethylvinylsiloxane units can be prepared by heating a mixture of the cyclic tetramer of dimethylsiloxane (octamethylcyclotetrasiloxane) with the cyclic tetramer of ethylvinylsiloxane (tetraethyltetravinylcyclotetrasiloxane) and water in the presence of a catalyst, for example, ammonium hydroxide. The relative amounts of the various dihydrocarbonsiloxy units which can be present in a hydroxy end-blocked polysiloxane oil can vary over a wide range without materially affecting the properties of the improved siloxane elastomer of my invention.

Referring particularly to a hydroxy end-blocked dimethylpolysiloxane oil as an illustrative example, such oils have molecular weights of from about 300 to about 1500 and above, preferably from about 900 to about 1300 and contain hydroxyl groups in an amount by weight of the oil of from about 1 percent up to about 10 percent, preferably from about 2.4 percent to about 3.5 percent. When hydroxy end-blocked polysiloxane oils contain hydrocarbon substituents other than, or in addition to, methyl groups, the molecular weight of the oils, will of course, lie in a range above that described for the dimethylpolysiloxane oils. In a like manner the hydroxy content of such polysiloxane oils would be relatively lower in value when the hydrocarbon substituents comprise groups other than, or in addition to methyl groups. In no event will the hydroxy content of the hydroxy end-blocked dihydrocarbon-substituted polysiloxane oils be greater than 10 percent and preferably not above 3.5 percent, by weight thereof.

Siloxane elastomers produced in accordance with the instant invention find wide use as wire and cable insulations, as well as vibration damping mounts, gaskets, seals, coating and the like applications requiring resistance to low and high temperatures.

The following examples serve to further illustrate the invention. All parts are by weight unless otherwise specified.

EXAMPLE 1

A glass reaction vessel was charged with dimethylpolysiloxane (900 g.) triethyltrimethylcyclotrisiloxane $[C_2H_5(CH_3)SiO]_3$ (95 g.) and a dimethylsiloxaneethylvinyl-siloxane copolymer containing 35 wt.-percent ethylvinylsiloxane units (7 g.) The mixture was heated at 150–155° C. and maintained at that temperature for 30 minutes. Potassium dimethylsilanolate $$(KO[(CH_3)_2SiO]K)$$

equivalent to 30 parts K per million parts siloxane was then added. This mixture was maintained at 150° C. for approximately 2½ hours and was then cooled to room temperature. A siloxane gum having a miniature penetrometer reading (MPR) of 56, was produced. This siloxane gum was composed of dimethylsiloxane units (90.27 weight percent), ethylmethylsiloxane units (9.48 weight percent), and ethylvinylsiloxane units (0.25 weight percent). Of the total number of moles of silicon-bonded hydrocarbon groups present in the siloxane gum about 4.14 mole percent were ethyl groups, .09 mole percent were vinyl groups and 95.77 mole percent methyl groups.

A composition was prepared on a 20 inch two-roll rubber mill employed the following ingredients:

155 g. of the above gum
62 g. of a finely divided silica filler
2.0 g. of iron oxide ($Fe_2O_3$)
23.3 g. of an ethoxy end-blocked dimethylsiloxane fluid $[C_2H_5O[(CH_3)_2SiO]_{10.5}C_2H_5]$
1.29 g. of di-tert-butyl peroxide The composition was mold cured (mold dimensions 6" x 6" x .075") at 340° F. for 20 min. followed by a post cure in the forced draft oven at 480° F. for 24, 48 and 72 hours. The following physical properties were found

|  | Hardness (Shore A) | Tensile (p.s.i.) | Elongation (percent) |
|---|---|---|---|
| Mold Cure (340° F.) | 49 | 1,150 | 670 |
| 24 hr. 480° F | 58 | 850 | 380 |
| 48 hr. 480° F | 59 | 830 | 310 |
| 72 hr. 480° F | 64 | 650 | 240 |

Gehman Low Temperature Test (ASTM 1053–58T) on the elastomer after a 24 hr. post cure at 480° F. was found to give a second order transition point at −120° F.

EXAMPLE 2

To a 1 gallon tin-coated reaction vessel was charged methylethylcyclosiloxane $[(CH_3)C_2H_5SiO]_{3,4}$ (368 g.), tetramethyltetravinylcyclotetrasiloxane $$[(CH_2=CH)CH_3SiO]_4$$

(6.13 g.), dimethylcyclosiloxane $[(CH_3)_2SiO]_{3,4}$ (2691 g.). The vessel was heated to 145° C. with stirring and potassium silanolate equivalent to 30 p.p.m. of potassium ion in total mixture was added (prepared by dissolving sufficient quantity of potassium silanolate containing 3% by weight potassium in 50 g. of $[(CH_3)SiO]_{3,4}$ to give 30 p.p.m. potassium+ when added to the reaction mixture). After the potassium silanolate addition, the material was heated to 150° C. with stirring. The vessel was then sealed and heated in a 150° C. oven for three hours. On cooling a water-white polysiloxane gum was obtained having a miniature penetrometer reading of 50. Several polysiloxane gums of varying ethylmethylsiloxane content were prepared in this manner with an average miniature penetrometer reading (MPR) of 50.

The polysiloxane gums were compounded on a 2 roll differential speed rubber mill according to the formulations given in Table I. The compositions were then cured to elastomers by heating in a 6" x 6" x .075" mold for 20 minutes at 340° F. The elastomers were subsequently heated to 480° F. for varying lengths of time during which time periodic tests were made of the physical properties of the elastomers. The results of the various tests of the physical properties of the elastomers prepared from the formulation of Table I are given in Table II.

Table I

| Formulation [a] | Polysilozane gum [b] | | Finely divided silica filler (parts) | Stabilizer | Ethoxy end-blocked dimethyl-siloxane fluid [c] parts |
|---|---|---|---|---|---|
| | Ethyl Methyl Siloxane Units percent by wt. | Methyl Vinyl Siloxane Units percent by wt. | | | |
| A | 10 | 0.2 | 30 | Iron oxide (2 parts) | |
| B | 12 | 0.2 | 30 | ___do___ | |
| C | 14 | 0.2 | 30 | ___do___ | |
| D | 12 | 0.2 | 28 | ___do___ | 10 |
| E | 14 | 0.2 | 38 | 2.14 parts [d] | 10 |
| F | 14 | 0.2 | 39.5 | 1.07 parts [d] | 10 |
| G (control) | 14 | 0.2 | 39.5 | | 10 |
| H (control) | 13 | 0.2 | 38 | | 10 |
| I (control) | 15 | 0.2 | 30 | Iron oxide (2 parts) | |
| J (control) | [e] 0 | 0.2 | 30 | ___do___ | |

[a] All formulations contained 0.8 part ditertiary butyl peroxide as the curing agent.
[b] The polysiloxane gums contained combined methylvinylsiloxy units and combined ethylmethylsiloxy units as listed; the remainder being dimethylsiloxane units.
[c] A dimethylsiloxane fluid having an ethoxy group bonded to each terminal silicon atom, the fluid having the average formula: $C_2H_5O-[(CH_3)_2SiO]_{10.5}C_2H_5$
[d] Stabilizer was cupric acetate deposited on finely divided silica. The silica contained 3.14 parts by weight cupric acetate per 100 parts silica.
[e] A dimethylpolysiloxane gum containing 0.2 percent by weight of combined methylvinylsiloxane units.

Table II

| Elastomer From Formulation | Mold Cured Properties | | | Post Cured Properties | | | |
|---|---|---|---|---|---|---|---|
| | Tensile (p.s.i.) | Elongation (percent) | Hardening, Shore A | Hours at 480° F. | Tensile (p.s.i.) | Elongation (percent) | Hardness, Shore A |
| A | | | | 24 | 520 | 290 | 45 |
| | | | | 96 | 550 | 240 | 50 |
| B | 720 | 400 | 41 | 24 | 680 | 280 | 52 |
| | | | | 72 | 530 | 220 | 53 |
| C | 810 | 470 | 40 | 24 | 590 | 270 | 53 |
| D | 1,190 | 350 | 48 | 24 | 1,180 | 310 | 56 |
| E | 1,420 | 540 | 42 | 24 | 1,180 | 340 | 56 |
| | | | | 144 | 570 | 120 | 68 |
| F | 1,260 | 630 | 42 | 24 | 1,040 | 300 | 62 |
| | | | | 144 | 720 | 100 | 76 |
| G | 1,220 | 470 | 49 | 24 | Too brittle to test non-elastomeric | | 92 |
| H | 1,150 | 580 | 43 | 24 | 370 | 30 | 82 |
| | | | | 48 | 360 | 20 | 85 |
| I | 800 | 410 | 40 | 24 | Too brittle to test | | 77 |
| J | 740 | 400 | 43 | 24 | 680 | 280 | 54 |
| | | | | 72 | 720 | 290 | 53 |

EXAMPLE 3

The low temperature properties of the elastomers were tested on a Gehman Torsional Apparatus according to ASTM method D-1053-58T. The low temperature properties were found to be dependent upon the amount of combined ethylmethylsiloxane units in the polysiloxane gum. The results are summarized in Table III below.

Table III

| Weight-percent ethylmethylsiloxane units in polysiloxane gum: | Second order transition point, ° F. |
|---|---|
| Elastomer J, 0 | −78 |
| Elastomer A, 10 | −122 |
| Elastomer B, 12 | −136 |
| Elastomer F, 14 | −144 |

EXAMPLE 4

A polysiloxane gum comprised of 87.8 percent by weight dimethylsiloxane units, 12 percent by weight ethylmethylsiloxane units and 0.2 percent by weight methylvinylsiloxane units having a total methyl, ethyl and vinyl group to silicon atom ratio of approximately 2 and a molecular weight of above 400,000 was compounded on a two roll differential speed rubber mill according to the following formulations. The compositions were then cured to elastomers by heating at 240° F. for 15 minutes in a mold (6" x 6" x .075"). The physical properties of the elastomers are given in Table IV.

| Formulation | K | L | M | N |
|---|---|---|---|---|
| Gum (parts) | 100 | 100 | 100 | 100 |
| Finely divided silica (parts) | 19 | 29 | 24 | 19 |
| Ethoxy end-blocked dimethyl siloxane fluid ($C_2H_5O(CH_3)_2SiO)_{10.5}C_2H_5$) | 8 | 8 | 8 | 8 |
| Iron (added as ferric octoate) (p.p.m.) | [2] 400 | [2] 400 | [2] 400 | [2] 400 |
| Catalyst [1] (parts) | 1.2 | 1.2 | 1.2 | 1.2 |
| Neo Novacite (finely divided quartz) (parts) | | | 40 | 80 |

[1] A solution containing 40 percent by weight 2,4-dichlorobenzoylperoxide dissolved in a dimethylsiloxane oil and dibutylphthalate mixture.
[2] Amount of iron present is 400 parts iron per 1 million parts of the organopolysiloxane gum.

Table IV

| Elastomers from Formulation | Mold-cured Properties | | Hardness, Shore A | Post cured 6 hours at 300° F. | | Hardness, Shore A | Post cured 24 hours at 480° F. | | Hardness, Shore A |
|---|---|---|---|---|---|---|---|---|---|
| | Tensile, p.s.i. | Elongation at break, percent | | Tensile, p.s.i. | Elongation at break, percent | | Tensile, p.s.i. | Elongation at break, percent | |
| K | 630 | 490 | 27 | 670 | 480 | 29 | 490 | 230 | 34 |
| L | 1,230 | 620 | 38 | 1,260 | 530 | 45 | 790 | 210 | 53 |
| M | 660 | 510 | 40 | 760 | 480 | 44 | 800 | 190 | 53 |
| N | 420 | 490 | 42 | 440 | 450 | 45 | 650 | 150 | 53 |

The elastomer were subjected to a dry-heat resistance test by placing them in a forced air oven at 450° F. for 70 hours. The results of this test is given in the following table.

Table V

| Elastomer from Formulation | K | L | M | N |
|---|---|---|---|---|
| Hardness Change (units) | +6 | +6 | +6 | +7 |
| Tensile Change (percent) | −11 | −10 | 0 | +15 |
| Elongation Change (percent) | −22 | −29 | −26 | −13 |

The elastomers were also subject to the ASTM No. 3, Oil Resistance Test for 70 hours at 300° F. The following table gives the results of such test.

Table VI

| Elastomer from Formulation | K | L | M | N |
|---|---|---|---|---|
| Hardness Change | −12 | −16 | −16 | −16 |
| Volume Change (percent) | +55 | +46 | +41 | +37 |

EXAMPLE 5

An organopolysiloxane gum composed of 12 percent by weight ethylmethylsiloxane units, 0.2 percent by weight methylvinylsiloxane units and 87.8 percent by weight dimethylsiloxane units was compounded on a 2 roll rubber mill employing the following formulations:

Table VII

| | O | P |
|---|---|---|
| Gum | 100 parts | 100 parts. |
| Silica filler | 28 parts | 28 parts. |
| Iron [1] | | |
| Copper [2] | | |
| Catalyst | 0.8(1) | 2.0(2). |
| $C_2H_5O[(CH_3)_2SiO]_{10}Et$ | 9 parts | 9 parts. |

[1] Iron added as ferric octoate and was employed in an amount sufficient to give 100 parts iron per one million parts gum.
[2] Copper added as 5% by weight, copper acetate deposited on finely divided silica. Sufficient copper acetate on silica was employed so as to give 100 parts copper per one million parts gum.

(1) Ditertiary butyl peroxide
(2) A 40 weight percent solution of 2,4 dichlorobenzoyl peroxide in a mixture of dimethylsiloxane oil and dibutylphthalate.

The formulations were cured in a mold (O, for 20 minutes at 340° F.) (P, for 15 minutes at 240° F.) to yield elastomers having the following properties:

Table VIII

| Elastomer | Mold Cured Properties | | | Properties after 24 hours at 480° F. | | |
|---|---|---|---|---|---|---|
| | Tensile, p.s.i. | Elongation, Percent | Durometer, Shore A | Tensile, p.s.i. | Elongation, Percent | Durometer, Shore A |
| O | 1,060 | 630 | 33 | 1,050 | 490 | 41 |
| P | 1,060 | 830 | 24 | 760 | 550 | 31 |

EXAMPLE 6

One hundred parts of organopolysiloxane gums of the following compositions:

Table IX

[Weight per cent unit]

| Gum | $(C_2H_5)_2SiO$ | $C_2H_5(CH_3)SiO$ | $CH_2=CH-(CH_3)SiO$ | $(CH_3)_2SiO$ |
|---|---|---|---|---|
| Q | 5.56 | | .2 | 9.424 |
| R | 6.97 | | .2 | 92.83 |
| S | | 9.58 | .2 | 90.22 |
| T | | 12.0 | .2 | 87.80 | were compounded on a 2 roll rubber mill with finely divided silica (34 parts), copper acetate deposited on a finely divided silica (4 parts, equivalent to 400 parts copper per million parts gum), an ethoxy end-blocked dimethylpolysiloxane fluid having the average formula: $C_2H_5O[(CH_3)_2SiO]_{10}C_2H_5$ (10 parts) and di-tertiary butyl peroxide (0.8 part).

The compounds were then cured in a standard mold at 340° F. for 20 minutes to yield elastomers. The physical properties of the elastomers are given in the following table.

B. *Elongation* (*ASTM D–412–51T*).—Amount of stretch of a sample under a tensile force expressed as a percentage of the original length:

$$\frac{(\text{Stretched length} - \text{original length})}{\text{Original length}} \times 100$$

C. *Hardness* (*ASTM D–676–49T*).—Degree of indentation produced by a plunger or indentor under a specific load. Measured with a Shore A Durometer. The values range from zero to maximum hardness of 100.

*Table X*

| Elastomer | Mold cured Properties | | Durometer (Shore A) | Properties after Post curing 24 hours at 480° F. | | | *Hours at 450° F. | Properties after post curing at 480° F. plus *hours at 450° F. | | |
|---|---|---|---|---|---|---|---|---|---|---|
| | Tensile, p.s.i. | Elongation, percent | | Tensile p.s.i. | Elongation, percent | Durometer (Shore A) | | Tensile, p.s.i. | Elongation, percent | Durometer (Shore A) |
| Q | 1,060 | 520 | 34 | 1,080 | 505 | 35 | 70 / 168 / 336 | 950 / 535 / 480 | 420 / 300 / 270 | 37 / 38 / 39 |
| R | 1,545 | 605 | 41 | 850 | 375 | 49 | 70 / 168 / 336 | 675 / 675 / 430 | 300 / 240 / 150 | 51 / 53 / 59 |
| S | 1,525 | 605 | 39 | 1,110 | 480 | 48 | 70 / 168 / 336 | 920 / 815 / 610 | 425 / 325 / 240 | 50 / 52 / 56 |
| T | 1,455 | 535 | 38 | 945 | 360 | 45 | 70 / 168 / 336 | 515 / 670 / 410 | 265 / 220 / 150 | 48 / 50 / 55 |

The percent volume swell of elastomers T and R was measured in ASTM No. 3 oil according to the procedure of ASTM D–471–59–T after 70 hours at 300° F. The volume swell was found to be as follows:

| Elastomers: | Percent volume change |
|---|---|
| R | 20.2 |
| T | 25.0 |

The terms and expressions employed in the examples and throughout this specification are to be interpreted as indicated in the following glossary.

GLOSSARY

A. *Miniature penetrometer.*—The miniature penetrometer used in determining the hardness of organopolysiloxane gums is a modification of the standard miniature penetrometer used in measuring the hardness or viscosity of a plastic substance, such as asphalt, made in accordance with suggestions contained in the article "Miniature Penetrometer for Determining the Consistency of Lubricating Greases," by Kaufman, Gus; Finn, W. J., and Harrington, R. J., Industrial and Engineering Chemistry, Analytical Edition, 11, 108–110, 1939.

In the modified miniature penetrometer, an aluminum plunger and penetrometer cone weighing 20 grams has been substituted for the steel plunger and penetrometer cone, weighing 150 grams, of the standard miniature penetrometer. Otherwise, the modified miniature penetrometer is of the same structure and dimensions as that described in the aforementioned article.

An organopolysiloxane gum is tested for hardness by lowering the penetrometer cone with the plunger into contact with the surface of the gum with the indicator reading zero. Then the penetrometer cone with its plunger is released to permit downward movement under the influence of gravity for a period of ten seconds, and the depth of penetration is shown in millimeters on an indicator associated with the device. The indicated penetration is identified as the miniature penetrometer reading (MPR).

D. *Tensile strength* (*ASTM D–412–49T*).—The force necessary to rupture a rubber specimen when stretched to the breaking point divided by the original cross-sectional area (lbs./sq. inch).

What is claimed is:

1. A composition of matter curable to a siloxane elastomer which comprises (1) 100 parts by weight of a copolymeric dihydrocarbonpolysiloxane gum having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups and wherein from 4.0 to 6.03 mole percent of the total number of hydrocarbon groups are ethyl groups, from 0.0185 to 0.5 mole percent of the total number of hydrocarbon groups are olefinically unsaturated groups and the remainder being methyl groups, (2) from 10 to 80 parts by weight per 100 parts by weight of copolymeric dihydrocarbonpolysiloxane gum of a finely divided silica filler, (3) a stabilizing amount of a heat stabilizer selected from the class consisting of ferric oxide, ferric octoate, ferric 2-ethyl hexoate, finely divided cupric acetate, a mixture of finely divided cupric acetate and ferric octoate, and a mixture of finely divided cupric acetate and ferric 2-ethyl hexoate and (4) an organic peroxide dihydrocarbonpolysiloxane gum curing catalyst.

2. A composition of matter curable to a siloxane elastomer which comprises (1) 100 parts by weight of a copolymeric dihydrocarbonpolysiloxane gum having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups and wherein from 4.0 to 6.03 mole percent of the total number of hydrocarbon groups are ethyl groups, from 0.0185 to 0.5 percent of the total number of hydrocarbon groups are olefinically unsaturated groups and the remainder are methyl groups, (2) from 10 to 80 parts by weight per 100 parts by weight of copolymeric dihydrocarbonpolysiloxane gum of a finely divided silica filler, (3) from 1 to 2 parts by weight per 100 parts by weight of copolymeric dihydrocarbonpolysiloxane gum ferric oxide, and (4) from 0.5 to 1.5 parts by weight per 100 parts by weight of copolymeric dihydrocarbonpolysiloxane gum of an organic peroxide dihydrocarbonpolysiloxane gum curing catalyst.

3. A composition of matter curable to a siloxane elastomer which comprises (1) 100 parts by weight of a copolymeric dihydrocarbonpolysiloxane gum having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups and wherein from 4.0 to 6.03 mole percent of the total number of hydrocarbon groups are ethyl groups, from 0.0185 to 0.5 percent of the total number of hydrocarbon groups are olefinically unsaturated groups and the remainder being methyl groups, (2) from 10 to 80 parts by weight per 100 parts by weight of copolymeric dihydrocarbonpolysiloxane gum of a finely divided silica filler, (3) a stabilizing amount of ferric octoate, and (4) from 0.5 to 1.5 parts by weight per 100 parts by weight of copolymeric dihydrocarbonpolysiloxane gum of an organic peroxide dihydrocarbonpolysiloxane gum curing catalyst.

4. A composition of matter curable to a siloxane elastomer which comprises (1) 100 parts by weight of a copolymeric dihydrocarbonpolysiloxane gum having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups and wherein from 4.0 to 6.03 mole percent of the total number of hydrocarbon groups are ethyl groups, from 0.0185 to 0.5 percent of the total number of hydrocarbon groups are olefinically unsaturated groups and the remainder are methyl groups, (2) from 10 to 80 parts by weight per 100 parts by weight of copolymeric dihydrocarbonpolysiloxane gum of a finely divided silica filler, (3) a stabilizing amount of ferric 2-ethylhexoate, and (4) from 0.5 to 1.5 parts by weight per 100 parts by weight of copolymeric dihydrocarbonpolysiloxane gum of an organic peroxide dihydrocarbonpolysiloxane gum curing catalyst.

5. A composition of matter curable to a siloxane elastomer which comprises (1) 100 parts by weight of a copolymeric dihydrocarbonpolysiloxane gum having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups and wherein from 4.0 to 6.03 mole percent of the total number of hydrocarbon groups are ethyl groups, from 0.0185 to 0.5 percent of the total number of hydrocarbon groups are olefinically unsaturated groups and the remainder are methyl groups, (2) from 10 to 80 parts by weight per 100 parts by weight of copolymeric dihydrocarbonpolysiloxane gum of a finely divided silica filler, (3) a stabilizing amount of finely divided cupric acetate, and (4) from 0.5 to 1.5 parts by weight per 100 parts by weight of copolymeric dihydrocarbonpolysiloxane gum of an organic peroxide dihydrocarbonpolysiloxane gum curing catalyst.

6. A composition of matter curable to a siloxane elastomer which comprises (1) 100 parts by weight of a copolymeric dihydrocarbonpolysiloxane gum having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups and wherein from 4.0 to 6.03 mole percent of the total number of hydrocarbon groups are ethyl groups, from 0.0185 to 0.5 percent of the total number of hydrocarbon groups are olefinically unsaturated groups and the remainder are methyl groups, (2) from 10 to 80 parts by weight per 100 parts by weight of copolymeric dihydrocarbonpolysiloxane gum of a finely divided silica filler, (3) a stabilizing amount of a finely divided silica whose surfaces are coated with cupric acetate, and (4) an organic peroxide dihydrocarbonpolysiloxane gum curing catalyst.

7. A composition of matter curable to a siloxane elastomer which comprises (1) 100 parts by weight of a copolymeric dihydrocarbonpolysiloxane gum having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups and wherein from 4.0 to 6.03 mole percent of the total number of hydrocarbon groups are ethyl groups, from 0.0185 to 0.5 percent of the total number of hydrocarbon groups are olefinically unsaturated groups and the remainder are methyl groups, (2) from 10 to 80 parts by weight per 100 parts by weight of copolymeric dihydrocarbonpolysiloxane gum of a finely divided silica filler, (3) a stabilizing amount of a mixture of ferric octoate, and finely divided cupric acetate, and (4) an organic peroxide dihydrocarbonpolysiloxane gum curing catalyst.

8. An organopolysiloxane elastomer which comprises a heat-cured composition comprising (1) 100 parts by weight of a copolymeric dihydrocarbonpolysiloxane gum having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups and wherein from 4.0 to 6.03 mole percent of the total number of hydrocarbon groups being ethyl groups, from 0.0185 to 0.5 percent of the total number of hydrocarbon groups being olefinically unsaturated groups and the remainder being methyl groups, (2) from 10 to 80 parts by weight per 100 parts by weight of copolymeric dihydrocarbonpolysiloxane gum of a finely divided silica filler, (3) a stabilizing amount of a heat stabilizer selected from the class consisting of ferric oxide, ferric octoate, ferric 2-ethylhexoate, finely divided cupric acetate, a mixture of finely divided cupric acetate and ferric octoate and a mixture of finely divided cupric acetate and ferric 2-ethylhexoate and (4) an organic peroxide dihydrocarbonpolysiloxane gum curing catalyst.

9. An organopolysiloxane elastomer which comprises a heat-cured composition comprising (1) 100 parts by weight of a copolymeric dihydrocarbonpolysiloxane gum having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups and wherein from 4.0 to 6.03 mole percent of the total number of hydrocarbon groups are ethyl groups, from 0.0185 to 0.5 percent of the total number of hydrocarbon groups are olefinically unsaturated groups and the remainder are methyl groups, (2) from 10 to 80 parts by weight per 100 parts by weight of copolymeric dihydrocarbonpolysiloxane gum of a finely divided silica filler, (3) from 1 to 2 parts by weight per 100 parts by weight of copolymeric dihydrocarbonpolysiloxane gum ferric oxide, and (4) from 0.5 to 1.5 parts by weight per 100 parts by weight of copolymeric dihydrocarbonpolysiloxane gum of an organic peroxide dihydrocarbonpolysiloxane gum curing catalyst.

10. An organopolysiloxane elastomer which comprises a heat-cured composition comprising (1) 100 parts by weight of a copolymeric dihydrocarbonpolysiloxane gum having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups and wherein from 4.0 to 6.03 mole percent of the total number of hydrocarbon groups are ethyl groups, from 0.0185 to 0.5 percent of the total number of hydrocarbon groups are olefinically unsaturated groups and the remainder being methyl groups, (2) from 10 to 80 parts by weight per 100 parts by weight of copolymeric dihydrocarbonpolysiloxane gum of a finely divided silica filler, (3) a stabilizing amount of ferric octoate and (4) from 0.5 to 1.5 parts by weight per 100 parts by weight of copolymeric dihydrocarbonpolysiloxane gum of an organic peroxide dihydrocarbonpolysiloxane gum curing catalyst.

11. An organopolysiloxane elastomer which comprises a heat-cured composition comprising (1) 100 parts by weight of a copolymeric dihydrocarbonpolysiloxane gum having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups and wherein from 4.0 to 6.03 mole percent of the total number of hydrocarbon groups are ethyl groups, from 0.0185 to 0.5 percent of the total number of hydrocarbon groups are olefinically unsaturated groups and the remainder are methyl groups, (2) from 10 to 80 parts by weight per 100 parts by weight of copolymeric dihydrocarbonpolysiloxane gum of a finely divided silica filler, (3) a stabilizing amount of ferric 2-ethylhexoate, and (4) from 0.5 to 1.5 parts by weight per 100 parts by weight of copolymeric dihydrocarbonpolysiloxane gum of an organic peroxide dihydrocarbonpolysiloxane gum curing catalyst.

12. An organopolysiloxane elastomer which comprises a heat-cured composition comprising (1) 100 parts by weight of a copolymeric dihydrocarbonpolysiloxane gum having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups and wherein from 4.0 to 6.03 mole percent of the total number of hydrocarbon groups are ethyl groups, from 0.0185 to 0.5 percent of the total number of hydrocarbon groups are olefinically unsaturated groups and the remainder are methyl groups, (2) from 10 to 80 parts of a finely divided silica filler, (3) a stabilizing amount of finely divided cupric acetate, and (4) from 0.5 to 1.5 parts by weight per 100 parts by weight of copolymeric dihydrocarbonpolysiloxane gum of an organic peroxide dihydrocarbonpolysiloxane gum curing catalyst.

13. An organopolysiloxane elastomer which comprises a heat-cured composition comprising (1) 100 parts by weight of a copolymeric dihydrocarbonpolysiloxane gum having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon group selected from the class consisting of vinyl, allyl and cyclohexenyl groups and wherein from 4.0 to 6.03 mole percent of the total number of hydrocarbon groups are ethyl groups, from 0.0185 to 0.5 percent of the total number of hydrocarbon groups are olefinically unsaturated groups and the remainder are methyl groups, (2) from 10 to 80 parts by weight per 100 parts by weight of copolymeric dihydrocarbonpolysiloxane gum of a finely divided silica filler, (3) a stabilizing amount of a finely divided silica whose surfaces are coated with cupric acetate, and (4) an organic peroxide dihydrocarbonpolysiloxane gum curing catalyst.

14. An organopolysiloxane elastomer which comprises a heat-cured composition comprising (1) 100 parts by weight of a copolymeric dihydrocarbonpolysiloxane gum having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups and wherein from 4.0 to 6.03 mole percent of the total number of hydrocarbon groups are ethyl groups, from 0.0185 to 0.5 percent of the total number of hydrocarbon groups are olefinically unsaturated groups and the remainder are methyl groups, (2) from 10 to 80 parts by weight per 100 parts by weight of copolymeric dihydrocarbonpolysiloxane gum of a finely divided silica filler, (3) a stabilizing amount of a mixture of ferric octoate and finely divided cupric acetate, and (4) an organic peroxide dihydrocarbonpolysiloxane gum curing catalyst.

References Cited by the Examiner

UNITED STATES PATENTS

| | | | |
|---|---|---|---|
| 2,445,794 | 7/1948 | Marsden | 260—46.5 |
| 2,495,363 | 1/1950 | Barry et al. | 260—37 |
| 2,759,904 | 8/1956 | Talcott | 260—37 |
| 2,849,473 | 8/1958 | Bailey et al. | 260—46.5 |
| 2,853,503 | 9/1958 | Bailey et al. | 260—46.5 |
| 2,999,076 | 9/1961 | Talcott | 260—37 |

FOREIGN PATENTS

| | | |
|---|---|---|
| 1,248,257 | 10/1960 | France. |

OTHER REFERENCES

"Silicones" (Fordham), published by George Newnes Ltd., London, 1960, pages 169–170 relied upon. Copy in Group 140.

"Inorganic Polymers" (Stone et al.), published by Academic Press, New York, 1962, pages 288–289 relied on.

MORRIS LIEBMAN, *Primary Examiner.*

MILTON STERMAN, ALEXANDER H. BRODMERKEL, *Examiners.*

UNITED STATES PATENT OFFICE
CERTIFICATE OF CORRECTION

Patent No. 3,234,174                              February 8, 1966

Thomas C. Williams

It is hereby certified that error appears in the above numbered patent requiring correction and that the said Letters Patent should read as corrected below.

Column 7, line 9, after "allyl," insert -- and --; column 8, line 9, for "employed" read -- employing --; column 14, line 73, column 15, lines 20, 40 and 60, column 16, lines 5, 24, 44 and 67, column 17, lines 14, 34 and 55, and column 18, lines 12 and 32, after "0.5", each occurrence, insert -- mole --.

Signed and sealed this 17th day of January 1967.

(SEAL)
Attest:

ERNEST W. SWIDER                            EDWARD J. BRENNER
Attesting Officer                                Commissioner of Patents